US009715854B2

(12) United States Patent
Kretz et al.

(10) Patent No.: US 9,715,854 B2
(45) Date of Patent: Jul. 25, 2017

(54) LCD DISPLAY WITH ROW ADDRESSING USING SAMPLING AND CONVERSION, AND DISPLAY METHOD

(71) Applicant: THALES, Courbevoie (FR)

(72) Inventors: Thierry Kretz, Saint Jean de Moirans (FR); Gérard Gomez, Grenoble (FR); Hugues Lebrun, Coublevie (FR)

(73) Assignee: THALES, Courbevoie (FR)

( * ) Notice: Subject to any disclaimer, the term of this patent is extended or adjusted under 35 U.S.C. 154(b) by 220 days.

(21) Appl. No.: 14/821,764

(22) Filed: Aug. 9, 2015

(65) Prior Publication Data

US 2016/0042697 A1 Feb. 11, 2016

(30) Foreign Application Priority Data

Aug. 8, 2014 (FR) ..................................... 14 01822

(51) Int. Cl.
*G09G 3/34* (2006.01)
*G09G 3/36* (2006.01)
*G09G 3/20* (2006.01)
*G06T 1/60* (2006.01)

(52) U.S. Cl.
CPC ............. *G09G 3/3406* (2013.01); *G06T 1/60* (2013.01); *G09G 3/2003* (2013.01); *G09G 3/3696* (2013.01); *G09G 2310/0208* (2013.01); *G09G 2310/0235* (2013.01); *G09G 2310/04* (2013.01); *G09G 2310/08* (2013.01)

(58) Field of Classification Search
None
See application file for complete search history.

(56) References Cited

U.S. PATENT DOCUMENTS 5,894,299 A 4/1999 Tsuchiya et al.
2004/0104882 A1 6/2004 Kitani et al.
2005/0078073 A1 4/2005 Mikami et al.
2006/0007098 A1 1/2006 Tong et al.
2012/0162238 A1 6/2012 Fleck et al.
2013/0057519 A1 3/2013 Kerofsky et al.

FOREIGN PATENT DOCUMENTS

EP 0 256 879 A2 2/1988

OTHER PUBLICATIONS

Anonymous, "Serial-in, Parallel-out Shift Register Chapter 12, Shift Registers, Electronics Textbook," Jun. 22, 2005, XP055233653 <http://www.allaboutcircuits.com/textbook/digital/chpt-12/serial-in-parallel-out-shift-register>.

*Primary Examiner* — Maurice L McDowell, Jr.
(74) *Attorney, Agent, or Firm* — Baker & Hostetler LLP

(57) ABSTRACT

A display has a graphics processor that extracts from image memory just rows that have non-zero luminance information items for the colour under consideration. For each row to be written, the processor sends to a set of N sampling and conversion circuits, at high frequency, a pattern representing the rows to be written, in the form of a succession of N bits. The N samplers successively sample these bits during the succession, to sample and block the bit of rank i in the sampling circuit of rank i, and produce a pattern of N control voltages VGon or VGoff on the rows as a function of the pattern of the received succession, while the graphics processor applies to the columns the luminance data to be written. The operation is repeated solely for the rows that have a luminance information item to be written in the colour under consideration.

15 Claims, 2 Drawing Sheets

MEMR
MEMV
MEMB
PRGR
data
DAC
OE
VL
DRV
E-C
RD
STRT
CPH
VGoff
VGon
N
P

LCD DISPLAY WITH ROW ADDRESSING USING SAMPLING AND CONVERSION, AND DISPLAY METHOD

CROSS-REFERENCE TO RELATED APPLICATION

This application claims priority to foreign French patent application No. FR 1401822, filed on Aug. 8, 2014, the disclosure of which is incorporated by reference in its entirety.

FIELD OF THE INVENTION

The invention concerns liquid crystal displays. It applies notably but not exclusively to colour sequential displays and the invention will be described in detail with regard to a colour sequential display.

BACKGROUND

These displays have a light box with light sources in a plurality of colours, which are lit successively and not simultaneously. The text that follows will refer only to the most conventional colours, red (R), green (G), blue (B), although other colours can be used in different distributions. Some displays use just two colours, for example green and red are involved equally. The pixels of the display do not have coloured filters. The image to be displayed is broken down electronically into three chromatic components corresponding to the three colours. The pixels are controlled as a function of the red component of the image to be displayed, the red light is turned on and then off, then the pixels are controlled as a function of the green component, the green light is turned on and then off, and finally the pixels are controlled as a function of the blue light and the blue light is turned on and then off. The rapid rate of these control and turn-on operations makes the human eye see a coloured image mixing with three components as if these three components were displayed simultaneously.

An image frame therefore comprises three subframes. In order to avoid a visual handicap due to a phenomenon referred to as "colour breakup", the subframes can each be divided into two or three, that is to say that there would be two or three red subframes displaying the same image, two or three green ones and two or three blue ones, in one and the same frame. Each subframe comprises a phase of, row-by-row, writing of all the luminance levels of the points of the image for the colour under consideration; this is followed by a stabilization phase taking account of the reaction time of the liquid crystal; and this is followed by a turn-on phase for the source of the colour under consideration in the light box. For a frame of 16.67 milliseconds (operation at 60 Hz), with six subframes of 2.78 milliseconds, these three phases can typically last 0.7 millisecond, 1.07 milliseconds and 1 millisecond. The writing phase is broken down into writing of N successive rows; by way of example, N=256 and the duration reserved for writing a row is then shorter than 3 microseconds.

A colour sequential display therefore requires liquid crystals and control circuits with very fast switching, in the absence of which the displayed image is at risk of being flawed. The aim of the invention is to limit the switching speed constraints for colour sequential displays primarily, but the invention also applies to coloured pixel mosaic displays quite particularly when they need to display information (text, symbols, etc.) that is not video images.

In some colour sequential mode display applications, particular information is displayed in a first specific colour, whereas the background of the image is displayed in the other colour(s). This is the case, for example (but not exclusively), in displays in the field of avionics or other fields in which the display of important information is required in a manner superimposed on a background image.

To simplify the explanations, the example of a two-tone display will be taken in which critical information is displayed in a first red colour in a manner superimposed on a background image displayed in green, for example the image of a countryside. However, the invention also applies if the background image uses two or more colours, other than the first colour reserved for the information, and applies even if the background is black, as will be seen. By way of example, the information can be coloured symbols, or coloured text.

SUMMARY OF THE INVENTION

The aim of the invention is to improve the performance of the display in terms of luminosity or colour compliance, by allowing certain cases to involve an increase in the time reserved for writing the information to the rows of pixels, and/or the time reserved for stabilizing the orientation of the liquid crystals after writing, and/or the turned-on time of the coloured light source, while remaining within the imposed frame time (and within the number of subframes chosen for colour sequential mode).

To this end, the invention proposes a liquid crystal display having pixel row addressing means that are different from those that are used in the prior art, said means allowing faster writing of an information item to be displayed when said information item does not take up the whole height of the display, so that more time can be reserved for other display phases. The invention moreover proposes a novel method for displaying an image in colour sequential mode with a light box having at least two sources of different colour, when the image has both an information item to be displayed in a first of these colours and a background to be displayed that does not have a component in the first colour.

The invention therefore involves the proposal of a matrix liquid crystal display having at least N rows and P columns; the display comprises an image memory containing the luminance data for the pixels for the whole image to be displayed, including data for each of M rows containing a non-zero image information item, M less than or equal to N, and a graphics processor that is capable of extracting from the memory the addresses of the M rows, and, for each of these, P luminance levels to be applied by P column conductors to the P pixels of the row, with a periodic duration $T_L$ for writing a row; the display also has a high-voltage stage having N inputs and having N outputs that are each respectively connected to a respective row conductor that is common to the pixels of one and the same row of the matrix in order to allow the selection of a row of pixels for the purpose of writing luminance data to this row. The display is further comprises:

N sampling and conversion circuits having at least one common signal input to be sampled, this input receiving from the graphics processor, for writing one row among the M rows, a pattern of N successive binary words in the course of a duration $T_L$, in which the binary word of rank i in the succession has a first value if the row of rank i needs to be written and another value if not, the binary words following one another at a frequency $F_H$ that is equal to at least $N/T_L$; the sampling and conversion circuits have sampling control inputs that are distinct from one another, the output of a sampling and conversion circuit of any rank i being connected to a corresponding input of rank i of the high-voltage stage and supplying this input with a voltage that is dependent on the binary word received, a sampling control circuit that is actuated at the frequency $F_H$ in sync with the succession of binary words of rank i=1 to N that are received at the common signal input of the sampling and conversion circuits, the sampling control circuit successively applying a sampling order to each of the N sampling control inputs of the sampling and conversion circuits, so as to sample and block in the sampling and conversion circuit of rank i the binary word of rank i from the succession of N binary words, a control input of the high-voltage stage in order to apply to the N row conductors voltages corresponding to the voltages that are present on the outputs of the sampling and conversion circuits at the end of reception of the succession of N binary words, and in order to maintain these voltages over a duration that is necessary for writing a row.

The binary words are single bits 0 or 1 if there is a need for just two voltages VGon (for writing) and VGoff (for an absence of writing) on the rows of pixels.

Therefore, the addressing of the rows for writing uses a principle in this display other than the conventional principle of a simple shift register that successively and systematically addresses each of the rows from 1 to N even if they do not have any useful luminance information. This principle reduces the time necessary for displaying an image frame when the useful information to be displayed is presented on a number of rows M that is significantly less than N (for example M<N/2 or less) because the duration necessary for writing is reduced to $M \times T_L$ instead of $N \times T_L$. However, this principle does not prevent the display of information using all of the N rows for the frames where this will be necessary.

The time gained over the writing of the rows can be distributed either in the form of a longer writing time for each row or in the form of a longer stabilization time for the liquid crystal if this is necessary, or finally in the form of a longer turned-on time for the light source in the first colour, which strengthens the visibility of the displayed information.

The sampling and conversion circuits are preferably dual sampling and conversion circuits ensuring sampling and conversion of a succession of N binary words during a phase of writing of a row while applying to the inputs of the high-voltage stage the result of the conversion of the succession of N binary words that is received in the course of a previous period $T_L$.

The sampling control circuit is preferably a shift register actuated at the frequency $F_H$ in sync with the succession of binary words of rank i=1 to N that are received at the common signal input of the sampling and conversion circuits, the register having N outputs of rank i=1 to N that are connected to the sampling control inputs, and the register applying to a single one of its outputs and successively to the outputs of rank i=1 to N a sampling control bit while the other outputs are inactive.

For a colour sequential display and for displaying an image having an information item for a first illumination colour component and for a background that does not have the first colour, provision may be made for the display to have:

in order to display the background, (conventional) means for successively applying, row by row, the luminance levels to the P columns of pixels beginning with the first row of rank 1 in the matrix and finishing with the Nth row of rank N for the subframe(s) not corresponding to the first colour, and in order to display the information in a subframe of the first colour, means for extracting from the image memory solely the data corresponding to M rows containing an information item to be displayed in the first colour and means for selecting, in order to write the subframe of the first colour, solely the M rows in question, row by row and a plurality of rows simultaneously when the luminance levels are identical for a plurality of rows according to the same columns.

Apart from the display whose structure has just been summarized, the invention concerns a method for the display in colour sequential mode that is particularly suited to displaying a colour information item superimposed on a background of different colour.

More precisely, the proposal relates to a method for displaying an image on a matrix liquid crystal display having N rows and P columns, of colour sequential type having at least two illumination colours, in which the image to be displayed has an information item having a component of a first of the two colours and a background that does not have a component in the first colour, the background and the information item being provided by an image memory containing the luminance levels of the pixels for the whole of the image to be displayed for each colour and for each row of the matrix and the levels being applied for each row to the P columns of the matrix before a phase of illumination with the colour corresponding to this row, characterized in that in order to display the information item in a subframe of the first colour solely the luminance levels corresponding to M rows having non-zero luminance points in this colour, M less than N, are extracted from the image memory, and the luminance levels are successively applied for these M rows, row by row, to the P columns of pixels without applying luminance levels to the P columns during this subframe for the other rows, whereas in order to display the background that does not have a component of the first colour luminance levels are successively applied row by row for the N rows to the P columns of pixels.

In this method, a row is written over a row duration $T_L$ for the subframe of the first colour preferably by applying to a set of N sampling and conversion circuits a signal to be sampled that is common to all these circuits and that, for writing a row over a duration $T_L$, is a series of N bits or binary words following one another at a frequency $F_H$ at least equal to $N/T_L$, where the binary word of rank i in the succession has a first value if the row of rank i needs to be written and a different value if not, and by sampling this signal successively in each of the sampling and conversion circuits at the frequency $F_H$ in sync with the succession of N binary words so as to sample and convert, in the sampling and conversion circuit of rank i, the word of rank i from the succession of N binary words. The sampling and conversion circuit of rank i controls the application of a desired voltage (defined by the binary word) to the row of pixels of rank i.

In order to display the background and possibly the colour components of the information other than the first colour, it is possible to proceed in the same manner or else to use conventional display for the background, in which the luminance levels are successively applied row by row to the P columns of pixels beginning with the first row of rank 1 in the matrix and finishing with the Nth row of rank N during the subframe(s) not corresponding to the first colour.

BRIEF DESCRIPTION OF THE DRAWINGS

Other features and advantages of the invention will emerge upon reading the detailed description that follows and that is provided with reference to the appended drawings, in which.

DETAILED DESCRIPTION

Figure 1:
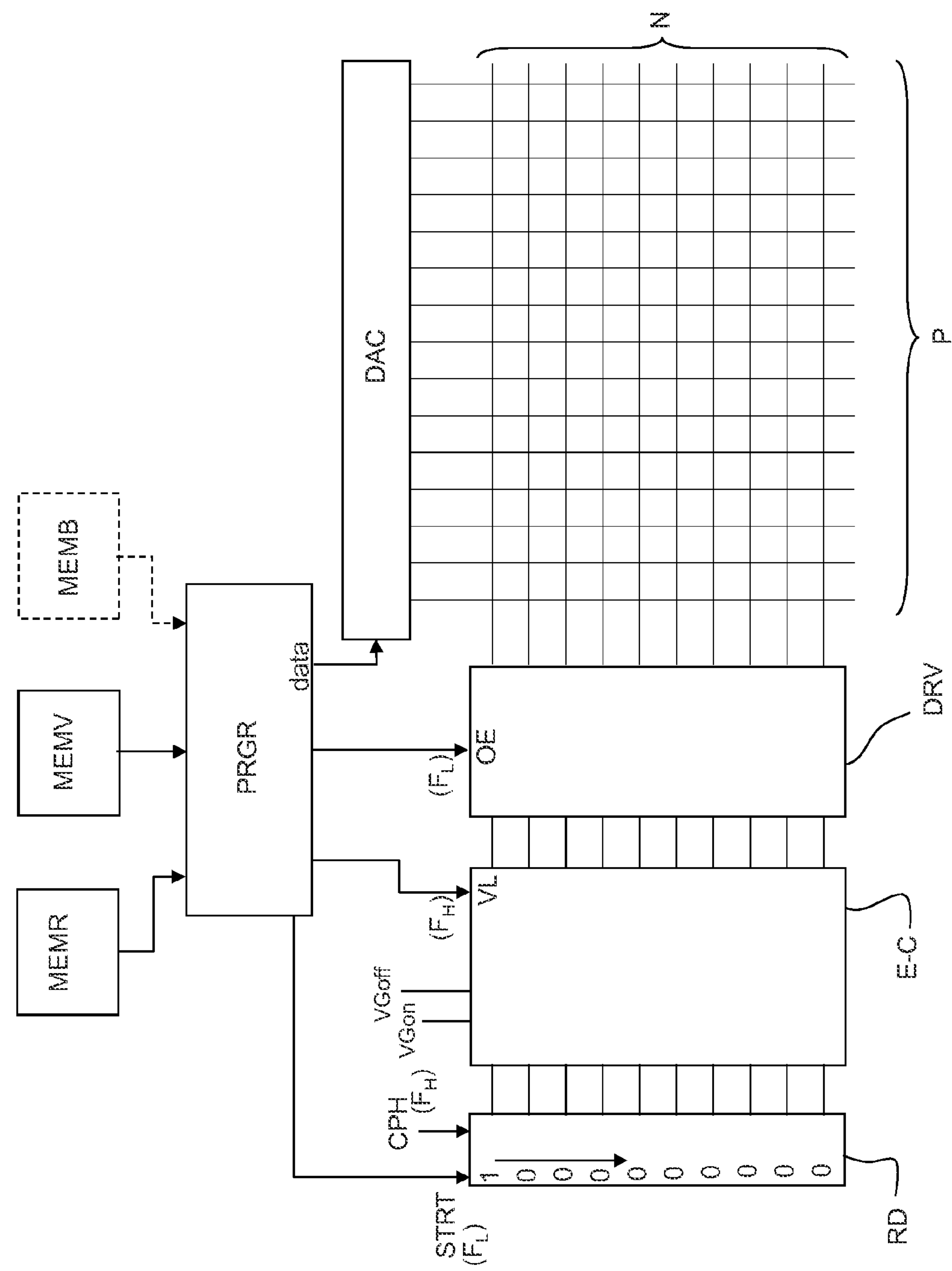
FIG. 1 shows the general structure of the display control circuits of the display according to the invention.

The invention will be described in detail with regard to a colour sequential display. For a coloured pixel mosaic display, there are no subframes corresponding to various colours and the invention applies to the display of the whole image in a frame, the illumination being provided by white light.

In the prior art, the rows of liquid crystal pixels in a matrix of N rows and P columns are successively written from the first row to the Nth row for each of the subframes corresponding to an illumination colour. This involves an N-section shift register transporting a high logic level from the first section to the Nth section at a frequency $F_L$ referred to as the row frequency. The row period $T_L=1/F_L$ is the duration that is necessary for completing writing one row of the matrix. Each section of the register corresponds to a row of pixels. The N parallel outputs of the shift register control the application of a voltage VGoff or a voltage VGon to the row conductors of the matrix (one row conductor per row of pixels, which is common to all the pixels of this row). Only the row conductor corresponding to the register output that is in the high state receives an active voltage VGon that allows the pixels of the row to be written. The others receive (generally but not always) an inactive voltage VGoff that does not allow the pixels of these rows to be written but that allows the luminance level to be maintained for the remainder of the subframe. In practice, each pixel has a control transistor and the gate of the transistor is connected to the common row conductor. The transistors for this row are turned on by the voltage VGon. The transistors of the other rows remain off. The drain of the transistor is connected to a column conductor that, in order to write a luminance level to the pixel situated at the point at which the row crosses a column conductor, receives an analogue voltage representing this level from the column conductor.

The rows of pixels are therefore activated in succession, from the row of rank 1 to the row of rank N at the frequency $F_L$. The writing of the subframe lasts $N \times T_L$. The light source corresponding to the subframe is turned on after the end of writing.

The present invention involves an attempt, by way of example, to display an image comprising the superimposition of a background image and a particular information item, notably a critical information item, a warning, etc. The information is displayed in a first colour that is particularly visible. The background is displayed in one or more other colours. The invention will be described primarily with regard to mixed display of an information item and a background, but the invention applies generally to the display of an information item even on a black background. It is more particularly of interest when the information to be displayed on the matrix of N rows takes up a number of rows that is significantly lower than the number N, for example less than half, whereas the background (a video image of countryside, for example) can take up all of the N rows.

In the simplest example, the colour sequential display has only two light sources, for example a green source for the background and a red source for the information.

In another example with three colours, the sequential display has three colour sources, a first colour (for example red) dedicated to the information and two other colours (blue and green, but not red) for the background.

However, the invention can be applied more generally even if the information to be displayed uses not only the first colour but perhaps other colours. The reason is that it is possible to provide for colours to be mixed in order to display a particular information item. By way of example, it may be desirable to display a warning information item in yellow and an information item indicating a danger in red. For the warning information item, two colours are then used, one colour for the background, the green, and the "first colour" dedicated to the information, the red, and these will form the information in yellow by being superimposed according to the principle of colour sequential technology.

More generally, the first colour used in order to display information can be mixed with the colour(s) used for the background. A principle remains that the background does not have a component in this "first colour".

In order to display the background colour and in order possibly to display colour components of the information that are common to the background, it is possible (but not obligatory) to proceed as in the prior art with a shift register (not shown) that successively scans all the rows from 1 to N at the row frequency.

To display the colour component that is not common to the background, however, the procedure will be different, as will now be explained in detail.

To simplify the explanations, it will now be taken that the colour component of the information is the red from a red light source and the colour of the background is the green from a green light source.

FIG. 1 shows an overview of the essential blocks allowing the invention to be implemented. The matrix of N rows and P columns of pixels is represented symbolically by a network of N horizontal row conductors and P vertical column conductors. The pixels are at the points at which the row conductors and a column conductor cross. The luminance data for each pixel of the image are brought on the column conductors that are common to each column of pixels. A row of pixels in the course of being written is selected by a respective row conductor.

Generally, in this description, the row conductors are the conductors controlling the turning-on of transistors, and the column conductors are the conductors that bring analogue voltages representing the luminance to be displayed to these transistors.

The images to be displayed, background and information that is to be superimposed, are placed in an image memory that contains the luminance data for each pixel, for each colour component, in digital form. The memory can be subdivided into partial memories corresponding to each subframe that is to be displayed, and therefore to each colour component. By way of example, there is a memory MEMV for the background image to be displayed in green and a memory MEMR for the information (warning text or symbols) to be displayed in a manner superimposed on the background. In dashed lines, an additional memory MEMB has been shown that would contain a blue image component, for example, if the background image had a green component and a blue component.

A graphics processor PRGR is used to extract, subframe by subframe and row by row inside a subframe, the luminance data that the memory contains. The luminance data for a row can arrive in series or in parallel in a digital-to-analogue converter DAC that transforms each luminance datum into an analogue voltage that will be applied to the pixel when the row containing this pixel is selected. The text that follows will refer to row period $T_L$ in order to indicate the total duration reserved for writing the luminance data for a row of pixels, and to row frequency $F_L=1/T_L$ in order to indicate the rate at which the various rows are written in a subframe. This frequency and this period are in principle the same as those that are applied for writing N successive rows in the background colours.

A row of pixels is selected by applying an appropriate voltage to the row conductor. In the simplest case, the voltage applied is a voltage VGon. The conductors of the unselected rows receive a voltage VGoff. More complex situations can be envisaged in which the voltage level on one or more rows that are adjacent to the writing row is neither the voltage VGon nor the voltage VGoff. This point will be returned to later, because the invention also applies in the latter case; to simplify, consideration will first of all be given to the simple case of two voltages: an active voltage VGon and an inactive voltage VGoff. These voltages are applied to the gate of the control transistor for each pixel, for all the pixels in a row. The voltages VGon and VGoff are typically approximately +25 volts and −7 volts.

The voltages VGon and VGoff are set up, for each of the N rows of the matrix, in each of N sampling and conversion circuits; these voltages are then applied to the N rows of the matrix by means of a high-voltage stage DRV. The high-voltage stage DRV has a series of N amplifiers.

The control circuit allowing the information of red colour to be written during a red subframe comprises a sampling and digital-to-analogue conversion assembly E-C comprising N sampling and conversion circuits. The output of the sampling and conversion circuit of rank i in the assembly E-C applies a voltage VGon or VGoff to the input of rank i of the high-voltage stage DRV; the output of rank i of the latter applies a voltage VGon or VGoff to the row of pixels of rank i. The function of the sampling and conversion circuit of rank i is to take at a given instant, defined by a sampling order, the logic value from a signal input to be sampled, and to convert this value into a voltage VGon if it is a first value or VGoff if it is another value; the converted voltage will be applied by the output of rank i of the high-voltage stage to the row of rank i over the duration reserved for writing a row.

In order to provide the sampling control for the assembly E-C, the write control circuit comprises a sampling control circuit having N outputs; the outputs are connected to the sampling control inputs (which are separate from one another) of the sampling and conversion circuits of the assembly E-C; they allow successive control of sampling by each of the N sampling circuits; in practice, the sampling control circuit is a shift register RD having N outputs.

The N sampling and conversion circuits have a common signal input VL to be sampled, this input receiving from the graphics processor, at a frequency $F_H$ equal to at least $N/T_L$, a pattern of N successive bits for writing a row over a period $T_L$; in this succession, the bit of rank i has a value 0 or 1 according to whether or not the row of rank i needs to be written over a determined period of duration $T_L$. The rate of arrival of the bits in the succession is the same ($F_H$) as the rate of arrival of the sampling orders received by the various sampling and conversion circuits, so as to sample and block, in the sampling and conversion circuit of rank i, the bit of rank i in the succession received at the common input VL.

It will later be seen that the common input VL of the sampling and conversion circuits can receive not a bit indicating the rank of a row that is to be written but rather a binary word of two bits in parallel (or more) when the requirement is to be able to apply not only a voltage VGon and a voltage VGoff but also one or more intermediate voltages VGint1, VGint2; this is the case, for example, when writing to a row of rank i, to which VGon is therefore applied, while hoping to temporarily apply an intermediate voltage to the adjacent row of rank i+1, in which there is no wish to write. This intermediate voltage can allow compensation for parasitic coupling between the row in the course of writing and its neighbours.

The shift register RD that constitutes the sampling control circuit has a serial input STRT that first of all receives a bit at logic level 1 and then solely 0 bits. It has N parallel outputs and it has an actuating input receiving a clock signal CPH at the frequency $F_H$, which is at least N times higher than the row frequency $F_L$. It therefore sets up a one level on the first output, the others being at zero, for the first clock period, a one level on the ith output, the others being at zero, for the ith clock period, and so on. The shift cycle initiated by the signal STRT restarts on every new row period. It is therefore the signal STRT that works at the row frequency, whereas the shifting works at the frequency $F_H$.

The shifting of the register at the frequency $F_H$ is carried out in sync with the succession of bits (or words of a plurality of bits in parallel) of rank i=1 to N that are received at the common signal input VL of the sampling and conversion circuits; the register successively applies a sampling order to each of the N sampling control inputs of the sampling and conversion circuits. When it changes to 1, the ith output of the register triggers a sampling operation by the ith sampling circuit, and the sampling value is that of the ith bit or binary word in the succession received at the input VL. Each sampled and converted value is blocked for the remainder of the sampling operation. The sampling of a pattern of N logic values can take place over one row period, and the use of the sampled pattern over the next row period.

The high-voltage stage DRV has a control input OE actuated at the row frequency $F_L$ ($F_L=1/T_L$) in order to apply to the N row conductors, at the end of the succession of N sampling operations, a pattern of voltages VGon and VGoff corresponding to the pattern of the succession of N binary words that has been received. The high-voltage stage then maintains these voltages over a duration that is necessary for writing a row. The control input OE can receive a control signal from the graphics processor PRGR, at the row frequency $F_L$. It can also receive a last bit of the shift register RD, indicating the end of a cycle of N successive shifts by the register.

In order to select a single row of rank i, which will be the most frequent case, for the purpose of writing luminance data to the pixels of this row, the common signal input VL of the series of sampling and conversion circuits will have applied to it a series of i−1 0 bits, then a 1 bit in the ith clock period CPH on the row of rank i, and finally a series of N−i+1 0 bits in the following periods. This loading operation lasts the time of N clock cycles at frequency $F_H$, and it is therefore accomplished at most over the duration of one row period. At the same time as the first bit of the pattern is applied, the single 1 bit will be applied to the output of rank 1 of the register RD; the 1 will then be shifted from the first output to the next output and then to the others, in sync with the succession of applied bits. The 0 bits for the input VL are sampled and converted into voltage VGoff in the i−1 first sampling and conversion circuits as the 1 in the register is shifted from the output of rank 1 to the output of rank i−1. The 1 bit at the input VL is presented in the ith period and is sampled and converted in the ith sampling and conversion circuit because the 1 level of the register RD is then presented at the ith output of the register.

At the end of the N periods of frequency $F_H$, the series of outputs of sampling and conversion circuits contains a pattern of voltages VGoff with a voltage VGon on a row of rank i. This pattern represents the pattern of addressing for the rows for writing a determined row.

If the information is such that a plurality of rows must receive exactly the same luminance data, there is a very good possibility of entering into the sampling and conversion assembly a pattern of a plurality of voltages VGon during a single cycle of shifts. This is the case, for example, if there is a requirement to write one or more red rectangles with a height equal to r rows, from the row i to the row i+r−1, and nothing in the other rows. In this case, successive 1 s are loaded at the input of the sampling and conversion assembly, from the rank i to the rank i+r−1, in a single cycle of duration $N \times F_H$. The r rows will be written simultaneously by the application of the red luminance levels from the memory MEMR to the columns during a single period of row $T_L$. This simultaneous writing can concern rows that are not adjacent.

It is the graphics processor that determines, from the image memory MEMR, what are the M rows that have a luminance information item different from zero in at least one pixel. These rows and these rows only are extracted from the memory MEMR. It is also the processor that determines which are the rows that have exactly the same luminance data and that then controls their simultaneous writing.

The processor then supplies the input VL, in order to write a single row of information of i, with a serial binary pattern, at the rate $F_H$, with i−1 successive zeros in periods of rank 1 to i−1, and then a 1 in the period of rank i, and again N−i+1 successive zero levels in the periods of rank i+1 to N. In sync with this supply, the shift register RD controls the sampling of these zeros in the samplers of ranks 1 to i−1, the sampling of the 1 in the sampler of rank i, and again the sampling of zeros in the samplers of rank i+1 to N. If a plurality of rows are written simultaneously with identical luminance information over a single duration $T_L$, the graphics processor supplies a serial binary pattern for this period, having as many 1 s as there are rows to be written simultaneously, in the periods of the frequency $F_H$ that correspond to these rows.

After each pattern, the input OE of the high-voltage stage DRV receives an order to set up high voltages, which is supplied by the graphics processor, and a selected row is then written: the graphics processor supplies the luminance data associated with this row. The signal OE is emitted at the row frequency FL.

The total duration of writing of the subframe is therefore $M \times T_L$ rather than $N \times T_L$, as would be the case in the prior art. This duration is therefore reduced all the more since the information to be displayed requires fewer rows. If a plurality of rows are written simultaneously, the writing time is reduced again since the processor loads the luminance data to be written for this group of plurality of rows only once.

The time gained for writing the frame can be used in several ways and notably in order to turn on the red light source for longer (without modifying the overall time reserved for the red subframe) in order to improve the visibility of the information. It can also be used in order to increase the time reserved for stabilization of the liquid crystal after the red subframe has been written and before the red light is turned on, in order to better ensure display of the desired information image.

Alternatively or additionally, if it is known in advance that there is a maximum number Zmax of rows of warning information to be displayed, it is possible to decide in advance that the red subframe has a shorter duration than the other subframes, in order to improve the operation of the other subframes that need to display N rows and therefore have to work very quickly.

The shift register RD can be bidirectional if there is a requirement to write the matrix alternately from bottom to top and then from top to bottom; it then has an input for selecting shift direction in order to make a shift alternately in one direction and then in the other.

This principle of operation in which the graphics processor manages only a limited number of rows having information to be displayed is quite compatible with the possibility of having a high-voltage stage DRV that uses more than two row voltage levels: VGoff, VGon, and intermediate levels VGint1, VGint2, etc. An instance that can be provided by way of example is as follows: the voltage VGon is applied to the row of rank i that requires writing, the voltage VGoff is applied to almost all the other rows, an intermediate voltage Vint1 is applied to an adjacent row of rank i+1, and an intermediate voltage Vint2 is applied to an adjacent row of rank i−1 or an adjacent row of rank i+2.

In this case, instead of applying to the input VL a single bit indicating whether the row requires writing (bit=1) or whether it does not require writing (bit=0), a binary word of two bits is applied to the input VL (in principle in parallel on two input conductors), said binary word defining whether there is a requirement to apply the voltage VGoff (word 00) or VGint1 (word 01) or VGint2 (word 10) or VGon (word 11).

At the moment at which a binary word of rank i is sampled, the sampling and conversion circuit produces the corresponding voltage on its output and it is this voltage that will be applied by the high-voltage stage when the signal OE is received at the end of the series of N sampling operations.

The principle of the invention is likewise compatible with the possibility of zeroing (to "white" level or to "black" level) the whole of the screen between each coloured subframe. This is because the screen can be totally zeroed to the black level between each subframe coloured by the graphics processor, which, in the time of a single row period $T_L$, can load a 1 level into the samplers/blockers over all the rows at once and then apply the black level to all the columns at once. The opposite (white level) can be done in exactly the same way.

It is likewise possible to perform this reinitialization to the black or white level for a specific area of the screen.

The previous comments about the distinction between the colour of the information and the colour of the background must be interpreted to mean that the background could be systematically black and naturally black (in the case of "normally black" LCD screens or OLEDs) and some information could be supplied in a plurality of colours and on a number of rows that is limited for each colour.

In this case, the principle of the invention can be applied independently for each colour that has only information about limited numbers of rows, for example a number of rows Mr for the red and a number My for the green, etc.

If the green-coloured background will require to be displayed by a conventional shift register having N outputs that is actuated at the row frequency $F_L$ and whose outputs directly control the inputs of the stage DRV, it will be understood that it is necessary to provide a switching circuit, not shown so as not to weigh down the figure, in order to switch to the N inputs of the high-voltage stage either the outputs of the traditional shift register (during the green subframe) or the outputs of the control circuit according to the invention (during the red subframe).

The luminance data supplied in digital form by the graphics processor PRGR are converted by the converter DAC into analogue voltages that are applied to the P columns of the display. Conventionally, the converter DAC can operate serially, that is to say convert each luminance datum arriving from the graphics processor successively, with sampling/blocking of the result in the successive columns in sync with the arrival of the P digital data, and simultaneous application of the sampled voltages to the columns at the end of the series of sampling operations for writing a row.

In this case, the frequency of this conversion can be a frequency $F'_H$ meeting the condition $F'_H$ at least equal to $P/T_L$ so that the display has time to produce the P analogue voltages over the duration reserved for writing a row.

If N and P are of the same order of magnitude, the same frequency $F_H$ from a clock CPH, and at least equal to $N/T_L$ and to $PT_L$, can be used for addressing the rows and for successively converting the luminance data.

Figure 2:
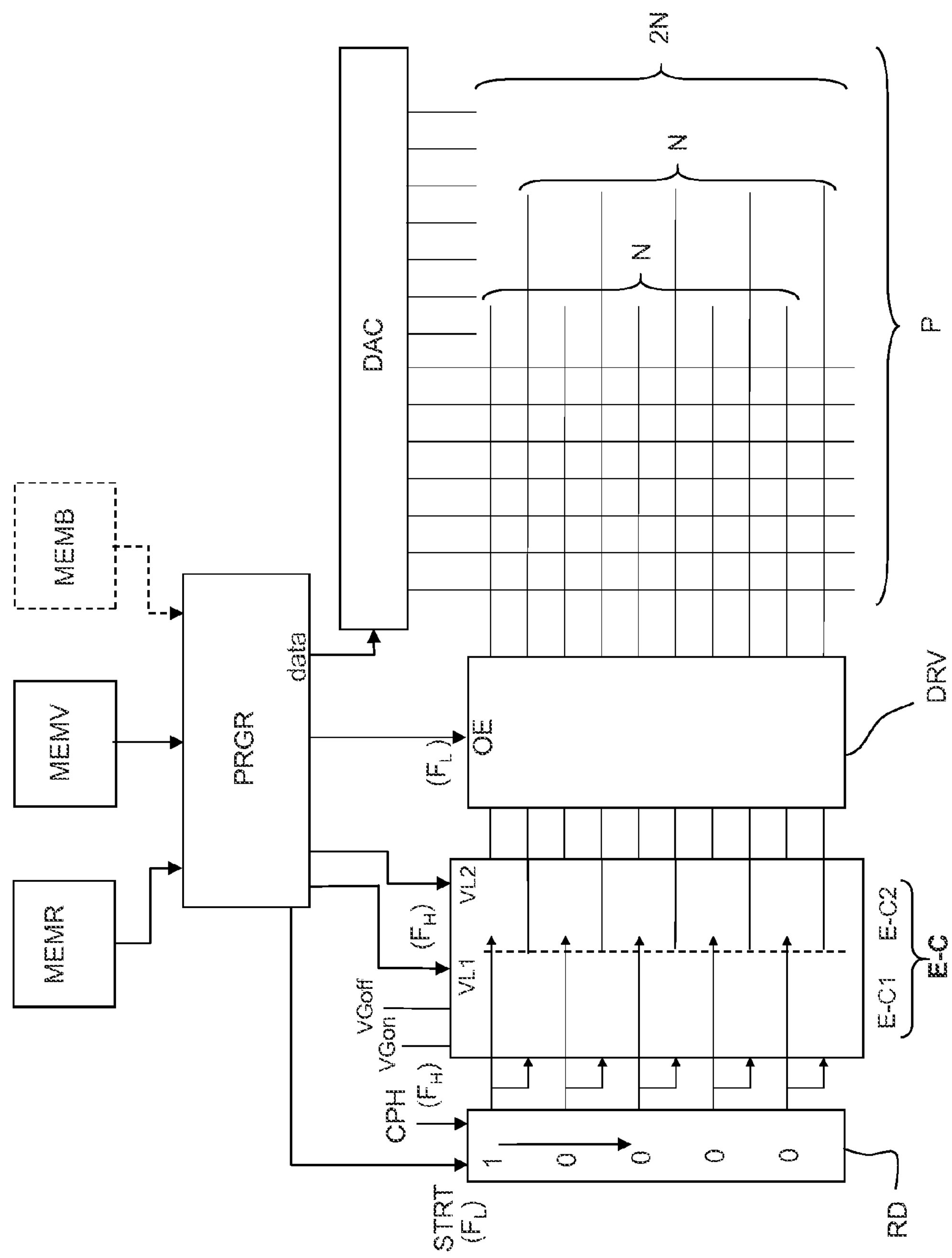
FIG. 2 shows a variant embodiment with a shift register having N/2 outputs and application of two signals to common inputs of two groups of samplers/blockers.

FIG. 2 shows a variant embodiment of the invention in which the sampling control circuit that controls N successive sampling operations has a shift register having a number of outputs that is less than the total number of rows in the matrix but that is a fraction of this number, with the aim of speeding up the loading of a pattern of bits into the high-voltage stage or conversely with the aim of using a lower frequency $F_H$ than the one that would theoretically be necessary.

In this case, the sampling and conversion assembly E-C is taken to be subdivided into k subassemblies of rank j=1 to k, the outputs of which are connected to k groups of N respective rows. Each subassembly of rank j=1 to k has a common input VLj and samples solely the bits (or binary words) that are present on its input. The N sampling and conversion circuits of one and the same subassembly successively receive, at the frequency $F_H$, their sampling order. The sampling order is given simultaneously for the k sampling circuits of the same rank i=1 to N.

The graphics processor manages the sending of the k successions of bits or binary words corresponding to k simultaneous patterns for addressing the rows taking account of the fact that the sampling order will be simultaneous for k sampling circuits at once.

FIG. 2 shows the case in which k=2. There are two groups of N rows. Each of the N outputs of the register defines a sampling command that is applied simultaneously to two sampling and conversion circuits that form part of a subassembly E-C1 and a subassembly E-C2, respectively; these two circuits correspond to two different rows. The two sampling and conversion circuits that receive the same sampling command can be arranged side by side or conversely can be arranged in two different groups of N juxtaposed sampling and conversion circuits. In one case, the groups of N rows are embedded in one another (as shown in FIG. 2). In the other case, they are juxtaposed.

The invention claimed is:

1. A matrix liquid crystal display having at least N rows and P columns, and comprising an image memory containing the luminance data for the pixels received for an image to be displayed, including data for each of M rows containing a non-zero image information item, M less than or equal to N, and a graphics processor that is capable of extracting from the memory the addresses of the M rows, and, for each of these, P luminance levels to be applied by P column conductors to the P pixels of the row, with a periodic duration $T_L$ for writing a row, and a high-voltage stage having N inputs and having N outputs that are each respectively connected to a respective row conductor that is common to the pixels of one and the same row of the matrix in order to allow the selection of a row of pixels for the purpose of writing luminance data to this row, the display further comprising:

- N sampling and conversion circuits having at least one common signal input to be sampled, this input receiving from the graphics processor a pattern of N successive binary words in the course of a duration $T_L$, in which the binary words follow one another at a frequency $F_H$ that is equal to at least $N/T_L$, for writing one row among the M rows, and in which the binary word of rank i in the succession has a first value if the row of rank i needs to be written and another value if not, the sampling and conversion circuits having sampling control inputs that are distinct from one another, the output of a sampling and conversion circuit of any rank i being connected to a corresponding input of rank i of the high-voltage stage and supplying this input with a voltage that is dependent on the binary word received,
- a sampling control circuit that is actuated at the frequency $F_H$ in sync with the succession of binary words of rank i=1 to N that are received at the common signal input of the sampling and conversion circuits, the sampling control circuit successively applying a sampling order to each of the N sampling control inputs of the sampling and conversion circuits, so as to sample and convert in the sampling and conversion circuit of rank i the binary word of rank i from the succession of N binary words,
- a control input of the high-voltage stage in order to apply to the N row conductors voltages corresponding to the voltages that are present on the outputs of the sampling and conversion circuits at the end of reception of the succession of N binary words, and in order to maintain these voltages over a duration that is necessary for writing a row.

2. The matrix liquid crystal display according to claim 1, wherein the sampling and conversion circuits are dual circuits ensuring the sampling of a succession of N binary words while applying to the inputs of the high-voltage stage the result of the sampling and the conversion of the previously sampled succession.

3. The matrix liquid crystal display according to claim 1, wherein the sampling control circuit is a shift register that is actuated at the shift frequency $F_H$ in sync with the succession of binary words of rank i=1 to N that are received on the common signal input of the sampling and conversion circuits, the register having N outputs of rank i=1 to N that are connected to the sampling control inputs, and the register successively applying to a single instance of its outputs of rank i=1 to N a sampling control bit while the other outputs are inactive.

4. The matrix liquid crystal display according to claim 3, wherein the matrix contains k groups of N rows, the display having k×N sampling/blocking circuits whose outputs are associated with the k×N rows of the matrix by means of the high-voltage stage, each output of the register simultaneously controlling the sampling control inputs of k sampling and conversion circuits, and the graphics processor applying a succession of N groups of k binary words in parallel to k parallel inputs that are each common to a respective group of N sampling and conversion circuits.

5. The matrix liquid crystal display according to claim 3, wherein the shift register is bidirectional and has a shift direction selection input in order to make a shift alternately in one direction and then in the other for different subframes.

6. The matrix liquid crystal display according to claim 1, for displaying an image having an information item for a first illumination colour component and for a background that does not have the first colour, the display having:

in order to display the background, means for successively applying, row by row, the luminance levels to the P columns of pixels beginning with the first row of rank 1 in the matrix and finishing with the Nth row of rank N for the subframe(s) not corresponding to the first colour, and in order to display the information in a subframe of the first colour, means for extracting from the image memory solely the data corresponding to M rows containing an information item to be displayed in the first colour and means for selecting, in order to write the subframe of the first colour, solely the M rows in question, row by row and a plurality of rows simultaneously when the luminance levels are identical for a plurality of rows.

7. The matrix liquid crystal display according to claim 6, in which said information item is displayed in a mixed colour, mixing a colour from the background and said first colour.

8. A method for displaying an image on a matrix liquid crystal display having N rows and P columns, of colour sequential type having at least two illumination colours, in which the image to be displayed has an information item having a component of a first of the two colours and a background that does not have a component in the first colour, the background and the information item being provided by an image memory containing the luminance levels of the pixels for the whole of the image to be displayed for each colour and for each row of the matrix and the levels being applied for each row to the P columns of the matrix before a phase of illumination with the colour corresponding to this row, wherein in order to display the information item in a subframe of the first colour solely the luminance levels corresponding to M rows having non-zero luminance points in this colour, M less than N, are extracted from the image memory, and the luminance levels are successively applied for these M rows, row by row, to the P columns of pixels without applying luminance levels to the P columns during this subframe for the other rows, whereas in order to display the background that does not have a component of the first colour luminance levels are successively applied row by row for the N rows to the P columns of pixels.

9. The method according to claim 8, wherein a row is written over a row duration $T_L$ for the subframe of the first colour by applying to a set of N sampling and conversion circuits a signal to be sampled that is common to all these circuits and that, for writing a row over a duration $T_L$, is a series of binary words following one another at a frequency $F_H$ at least equal to $N/T_L$, where the binary word of rank i in the succession has a first value if the row of rank i needs to be written and another value if not, and by sampling this signal successively in each of the sampling and conversion circuits at the frequency $F_H$ in sync with the succession of N binary words so as to sample and convert, in the sampling and conversion circuit of rank i, the word of rank i from the succession of N binary words, the sampling and conversion circuit of rank i controlling the application of a desired voltage, which is defined by the binary word of rank i, to the row of pixels of rank i.

10. The method according to claim 9, wherein as a function of the binary word of rank i, the sampling and conversion circuit of rank i selects and applies a voltage level to the row of rank i, which is a selection level if the row needs to be written, and, if the row does not need to be written, a deselection level or an intermediate level among one or more intermediate voltage levels.

11. The method according to claim 9, wherein the pattern of N successive binary words has a plurality of words having the first value and the other words having other values if a plurality of rows need to receive identical luminance levels for their P pixels, these rows then all being written simultaneously.

12. The method according to claim 11, in which said plurality of rows can be written simultaneously in order to reinitialize their P pixels.

13. The method according to claim 9, wherein the pattern of N successive binary words the N words all have the same value if all the rows of the matrix need to receive a reinitialization level for their P pixels, all these rows then all being written simultaneously.

14. The method according to claim 9, wherein the sampling and conversion circuits ensure the sampling and conversion of a succession of N binary words during a phase of writing of a row while applying to the inputs of the high-voltage stage the result of the conversion of the succession of N binary words that is received over the course of a previous period $T_L$.

15. The method according to claim 8, wherein, in order to display the background and possibly the colour components of the information other than the first colour, the luminance levels are successively applied row by row to the P columns of pixels beginning with the first row of rank 1 in the matrix and finishing with the Nth row, of rank N, for the subframe(s) not corresponding to the first colour.

* * * * *